United States Patent [19]
Brazas

[11] Patent Number: 5,521,995
[45] Date of Patent: May 28, 1996

[54] SEGMENTED WAVEGUIDE GRATINGS USED AS OPTICAL TILT AND DISPLACEMENT SENSORS

[75] Inventor: John C. Brazas, Rochester, N.Y.

[73] Assignee: Eastman Kodak Company, Rochester, N.Y.

[21] Appl. No.: 4,020

[22] Filed: Jan. 15, 1993

[51] Int. Cl.$^6$ .................................. G11B 7/00; G02B 6/34
[52] U.S. Cl. .............................. 385/37; 385/14; 356/356; 369/44.12
[58] Field of Search ..................................... 356/356, 138; 359/566, 569, 363, 375; 369/44.12; 385/14, 15, 12, 37

[56] References Cited

U.S. PATENT DOCUMENTS

| | | | |
|---|---|---|---|
| 4,664,524 | 5/1987 | Hattori et al. | 356/356 X |
| 4,923,300 | 5/1990 | Michel et al. | 385/37 X |
| 5,044,718 | 9/1991 | Kando | 385/14 X |
| 5,051,974 | 9/1991 | Taniguchi et al. | 369/44.12 |
| 5,182,610 | 1/1993 | Shibata | 356/356 X |
| 5,200,939 | 4/1993 | Nishiwaki et al. | 385/14 X |
| 5,204,516 | 4/1993 | Opheij | 385/37 X |
| 5,208,800 | 5/1993 | Isobe et al. | 385/37 X |

Primary Examiner—Rodney B. Bovernick
Assistant Examiner—Hemang Sanghavi
Attorney, Agent, or Firm—Raymond L. Owens

[57] ABSTRACT

An apparatus and method are provided for monitoring pointing of a beam in an optical device. The apparatus includes a first input coupling grating having a first grating length and first and second regions for input coupling over a first range of incident angles and producing a first signal, and a second input coupling grating having a second grating length and third and fourth regions for input coupling over a second range of incident angles and producing a second signal. The first grating length is greater than the second grating length thereby making the first range of incident angles less than the second range of incident angles. The method includes forming an input coupling grating for receiving the incident beam, forming a first region on the grating for input coupling the incident beam at a first input coupling angle for deriving a first peak efficiency, and forming a second region on the grating for input coupling the incident beam at a second input coupling angle for deriving a second peak efficiency and separating the first input coupling angle from the second input coupling angle so that a change in angle of incidence will produce an increase in input coupled light in one region and a decrease in the other.

20 Claims, 12 Drawing Sheets

SEGMENTED WAVEGUIDE GRATINGS USED AS OPTICAL TILT AND DISPLACEMENT SENSORS

CROSS-REFERENCE TO RELATED APPLICATIONS

This application is related to cofiled application Ser. No. 08/004,811 entitled Segmented Waveguide Gratings Used As Optical Recording Sensors.

1. Technical Field of the Invention

The invention generally pertains to an optical device, and, more particularly, to an apparatus and method for monitoring tilt and displacement of a component of an optical system wherein an optical beam incident on the component will produce signals that will change in a predetermined way with tilt or displacement of the components, relative to the optical beam.

2. Background of the Invention

In optical systems used for imaging, wavefront analysis or component positioning, the ability to detect changes in optical alignment, can be a critical part of the operation. The location across the optical axis (displacement) and the rotation of a component relative to the optical axis (tilt) will be key to the performance of the system. The ability to observe changes in tilt or displacement is most important when an optical system may be exposed to mechanical shock or significant temperature variations during use which affect the support system for the components. Temperature variations across the support system can produce movement of elements as the result of thermal expansion, and mechanical shock due to acceleration, vibrations or impact can alter the support system by distortion or breakage, or possibly result in an alteration of the optical component.

Integrated optical devices used as sensors to detect changes in an optical system have the advantages of being lightweight and planar requiring small area and volume, having waveguide element alignment as part of fabrication, and facilitating integration with detectors and preamplifiers when using silicon based substrates. A reference which provides background for waveguides and waveguide gratings is Integrated Optics, Springer-Verlag (1975), edited by T. Tamir.

SUMMARY OF THE INVENTION

The present invention is directed to one or more of the problems set forth above. Briefly summarized according to one aspect of the invention, an apparatus for monitoring tilt of a component in an optical device comprises a first input coupling grating having a first grating length and first and second regions for input coupling over a first range of incident angles and producing a first signal, and a second input coupling grating having a second grating length and third and fourth regions for input coupling over a second range of incident angles and producing a second signal. The first grating length is greater than the second grating length thereby making the first range of angles over which input coupling into the waveguide occurs less than the second range of incident angles for the second grating length.

According to another aspect of the present invention, a method for forming an optical device wherein an incident beam of light undergoes a change in incident angle in response to changes in tilt of a component of the optical system comprises the steps of forming a substrate, forming a waveguide layer on a surface of a substrate, forming a cladding and positioning the waveguide layer between the cladding and the substrate, forming waveguide regions of different thicknesses and adjusting an effective refractive index of each region, and input coupling the return beam via a linear input coupling grating.

Integrated optical components have the advantage of being planar. With integrated optical components, alignment is part of the fabrication process and integration of optical components with detectors and preamplifiers is facilitated when using silicon based substrates. Also, integrated optical elements described herein provide new methods of detecting error signals not available by conventional optical components.

According to another aspect of the invention, a method for monitoring tilt of a component in an optical system comprises the steps of forming an input coupling grating for receiving an incident beam, forming a first region on said grating for input coupling said incident beam at a first input coupling angle for deriving a first peak of input coupled light efficiency, and forming a second region on said grating for input coupling said incident beam at a second input coupling angle for deriving a second peak of input coupled light efficiency and separating said first input coupling angle from said second input coupling angle by about the full-width-half-maximum of coupling efficiency so that a change in the angle of incidence will produce an increase in the input coupled light of one region and there will be a decrease in the input coupled light of the other region.

According to another aspect of the invention, a method for monitoring tilt and displacement of a component in an optical system comprises the steps of forming an input coupling grating for receiving an incident beam, forming a first region on said grating for input coupling said incident beam at a first input coupling angle for deriving a first peak of input coupled light efficiency, and forming a second region on said grating for input coupling said incident beam at a second input coupling angle for deriving a second peak of input coupled light efficiency and separating said first input coupling angle from said second input coupling angle by about the full-width-half-maximum of coupling efficiency so that a change in the angle of incidence will produce an increase in the input coupled light of one region and there will be a decrease in light of the other region.

To simultaneously detect the tilt and displacement of an optical component, third and fourth grating regions are formed within the cross-sectional area of the beam and are placed opposite the first and second region pair within the area. The third area is designed to match the input-coupling characteristics of the first region, and the fourth region is designed to match the input-coupling characteristics of the second region. For incident beams having nonuniform but symmetric intensity profiles, the movement of the area of illumination along the axes defining the placement of the gratings will produce an increase in the light input coupled for one grating pair and there will be a decrease in the light input coupled for the other grating.

These and other aspects, objects, features and advantages of the present invention will be more clearly understood and appreciated from a review of the following detailed description of the preferred embodiments and appended claims, and by reference to the accompanying drawings; and by reference to cofiled application Ser. No. 08/004,811 which is incorporated herein by reference.

DETAILED DESCRIPTION OF THE PREFERRED EMBODIMENTS

The present invention uses a linear waveguide grating for input coupling of light to generate pointing error signals resulting from changes in the angle of incidence for an optical beam. The pointing error signal detection is based on processing of the optical beam using a segmented grating to observe changes in the intensity of coupled light due to tilt of an optical component where the segmented grating may be mounted on the optical component or located at a position to receive a reflection off of the optical component. The principle of operation for detection of pointing error signals (PES) is based on the angular dependence of the input coupling efficiency of the grating on the angle of incidence, discussed in detail below.

Figure 1:
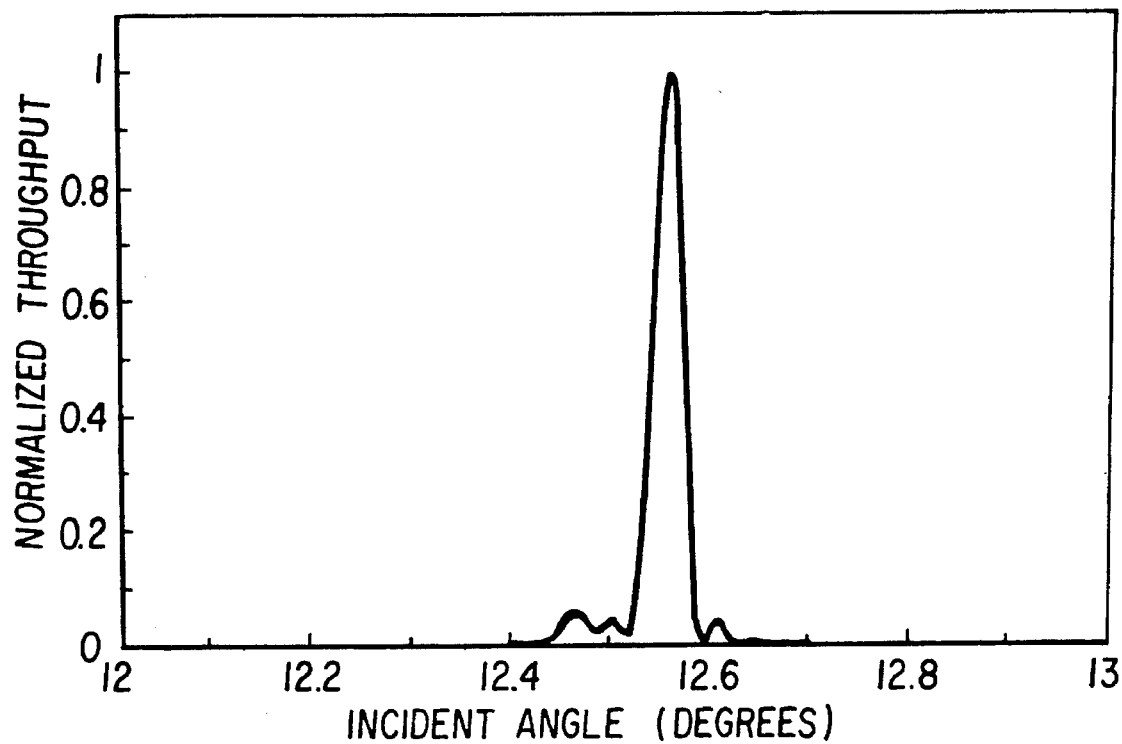
FIGS. 1–3 are graphs showing angular sensitivity of the coupling efficiency for grating lengths of 1.0 mm, 0.5 mm, and 0.25 mm, respectively
Figure 2:
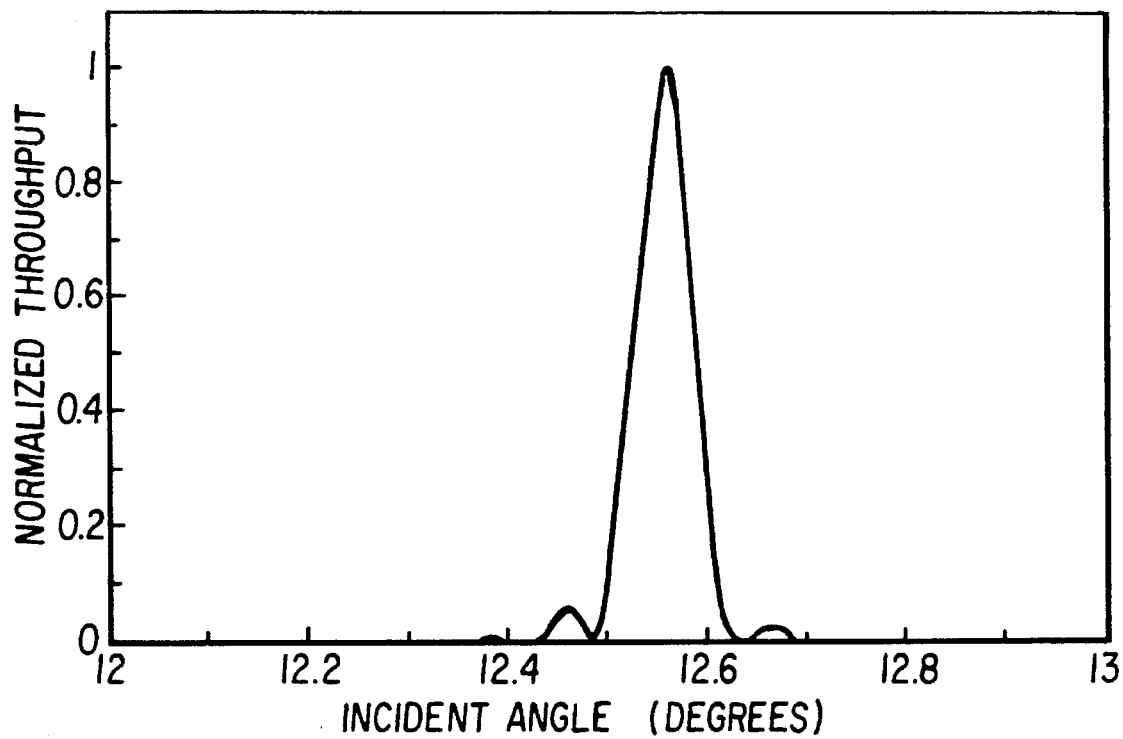
Figure 3:
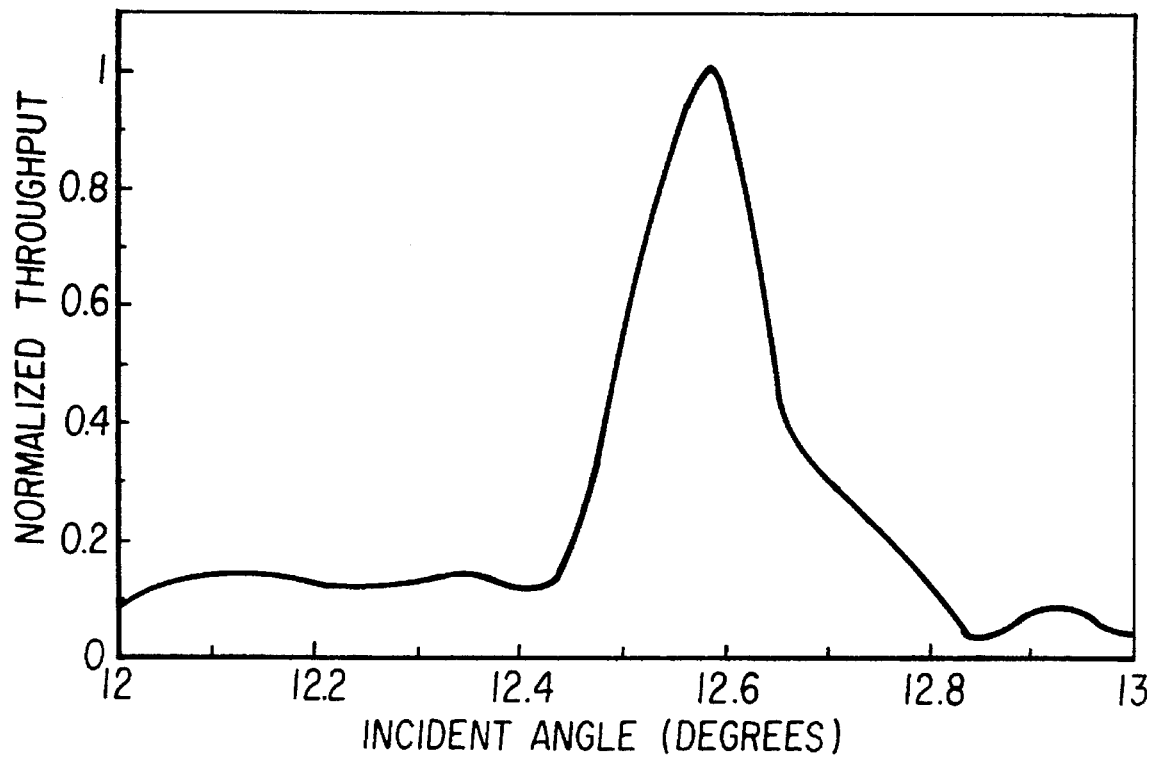

Input coupling efficiency of gratings have an angular dependence based on diffraction theory and the dimensions defining the grating system, i.e., beam waist or apertures of the incident beam, intrinsic grating coupling length, and grating length as demonstrated with a grating to couple 632.8 mm light into a waveguide at an angle of about 13 degrees relative to the normal of the waveguide plane. The curves of FIGS. 1–3 plot relative intensity as a function of incident angle and were generated for grating lengths of 1.0 mm, 0.50 mm, and 0.25 mm, respectively. The angular sensitivity of the grating can be stated in terms of the intensity full-width-half-maximum (FWHM). Measured values for the apertures above were 0.035 degrees, 0.067 degrees and 0.132 degrees, respectively.

The use of a slit-like grating introduces an angular spectrum into the discrete diffraction orders analogous to the effect of a slit on a planewave where the far-field diffraction will be diverging at a rate inversely proportional to the slit size. For a waveguide grating system, the waveguide will select the portion of the angular spectrum which overlaps the angular width associated with the propagation angle of the guided mode. Because the angular content of the diffracted order increases with a decreasing grating length, $L_{gr}$, there will be an increase of the FWHM for the angular dependence of the input coupling efficiency for decreasing value of $L_{gr}$. Both the FWHM and peak efficiency of the angular dependence for input coupling are characteristics of the waveguide grating in this discussion and will be referred to as the grating response. The ability to control the grating response by adjusting the grating length is important for selecting the working range of a practical device. Also, the waveguide grating design affects the grating response by determining the characteristic coupling length, $1/\alpha$, where $\alpha$ is the coupling coefficient associated with waveguide gratings as described in Tamir. The coupling length affects the angular width of the order coupled to the guided mode in a similar fashion to the value of $L_{gr}$ by also determining the length of grating over which light is input or output coupled. To maximize coupling efficiency for a given waveguide grating, $1/\alpha$ is near the value of $L_{gr}$.

The waveguide can be formed by vacuum deposition of an organic glass useful for the formation of passive waveguide devices. The film forming process is a line-of-sight deposition of a mixture of similar organic compounds to generate glass thin-films well suited for use as optical waveguides which produce waveguides with low propagation losses, between 0.2 to 0.5 dB/cm, good thermal stability and refractive index reproducibility. The standard coating conditions were a chamber pressure less than $5\times10^{-6}$ Torr, an ambient substrate temperature, a deposition rate of 0.5 nm/sec, and a source-substrate separation of 65 cm. The resulting films had thickness uniformities of ±0.6% over 50 $cm^2$ and accuracies within ±1% were obtained with optical monitoring techniques. Additional material can be added through a thin metal deposition mask when differences in thickness are needed.

EXAMPLE 1

Demonstration of Pointing Error Signal Generation Using a Segmented Grating

Figure 4:
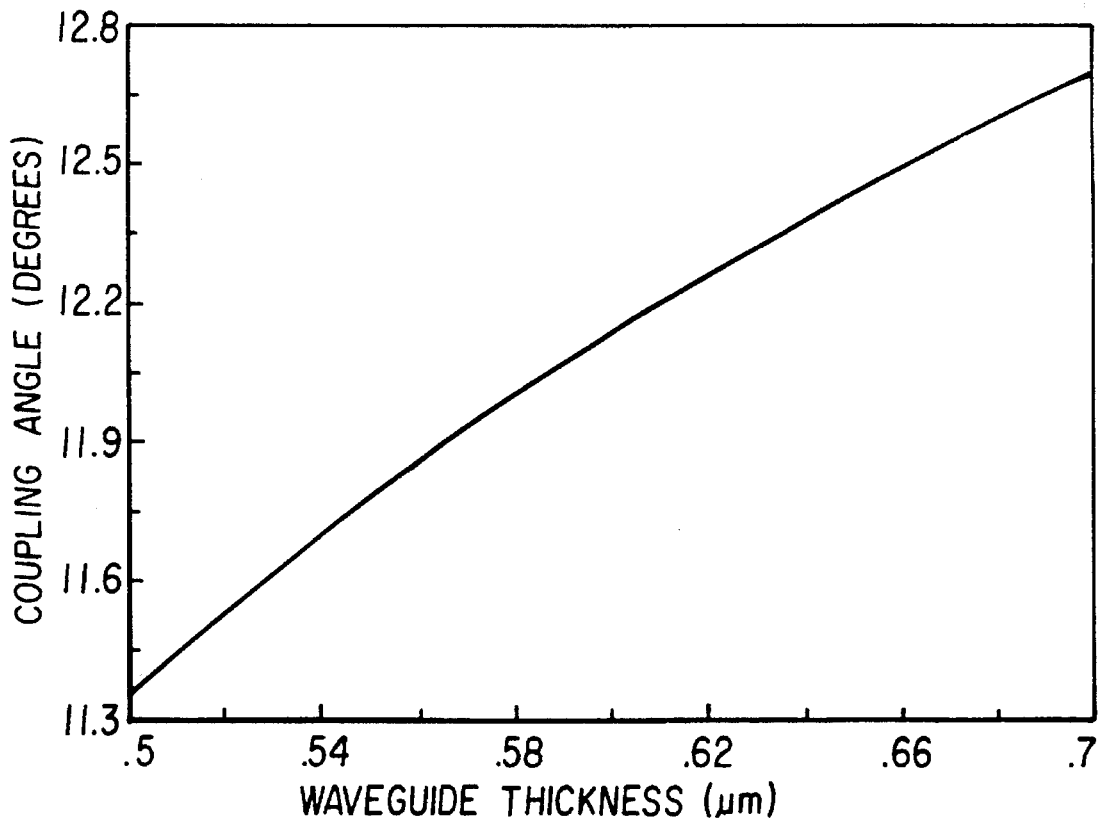
FIG. 4 is a graph showing the dependence of the nominal coupling angle on waveguide thickness.

Referring to FIG. 4, a waveguide grating can be used to monitor the incidence angle of the optical beam by simply detecting an intensity change of the input coupled light with a change in incident angle. However, a change in the incident angle could produce either an increase or decrease of the coupled light depending on the initial alignment of the grating. An alternative is to divide the grating into two segments with the input coupling angles for their peak input coupling efficiencies separated by about the FWHM. The input coupling angle for peak intensity within the waveguide for each segment can be selected by altering the waveguide system refractive indices, the grating period, or the waveguide thickness to affect the effective refractive index. The present invention creates a difference in the thickness of the waveguide.

The grating design included fabrication of the grating in a Pyrex substrate with a period of 0.45 microns, a depth of 28 run, and a duty cycle of 50% with a square-wave profile. A film of organic glass was vacuum deposited onto the substrate to form a waveguide having a uniformity of better than 1% and a thickness of 0.6 microns to within 1% error. The index of the waveguide was about 1.66 at a wavelength of 632.8 nm. The input coupling angle for peak efficiency was about 13 degrees.

FIG. 4 shows the calculated sensitivity of the coupling angle to waveguide thickness where the grating pitch is 0.45 μm. Masking the sample and then depositing an additional 3.5 nm into an adjacent region shifts the local coupling angle by 0.016 degrees. This difference in waveguide thickness creates distinct segments of the waveguide-grating. Using a collimated input beam and monitoring the input coupled intensity, imaging light scattered from the waveguide onto a CCD array, the relative amount of light coupled into the waveguide can be monitored. When the angle of incidence (pointing) of the optical beam is adjusted to the angle intersection Θ corresponding to the intersection of the response of the grating segments, an increase or decrease of the difference of the signals of these segments can be directly related to the direction and magnitude of the pointing change.

Figure 5:
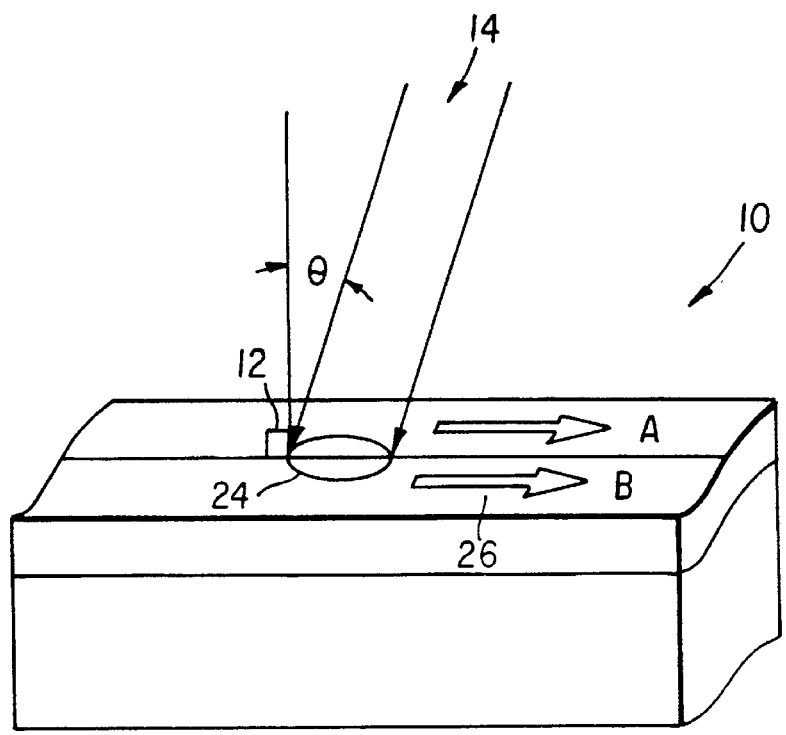
FIG. 5 is a perspective view of a segmented waveguide-grating.

FIG. 5 illustrates a device used to generate a useful pointing error signal (PES). An optical device 10 has adjacent regions A and B of an input coupling grating 12 fabricated to have a difference in their input coupling angle for peak efficiency ideally separated by about the same value as the FWHM of the grating response 24. The response of each segment to a rotation of the grating 12 relative to a collimated input beam 14 is similar to the response suggested in FIGS. 1–3 for coupling efficiency as a function of incident angle.

Figure 6:
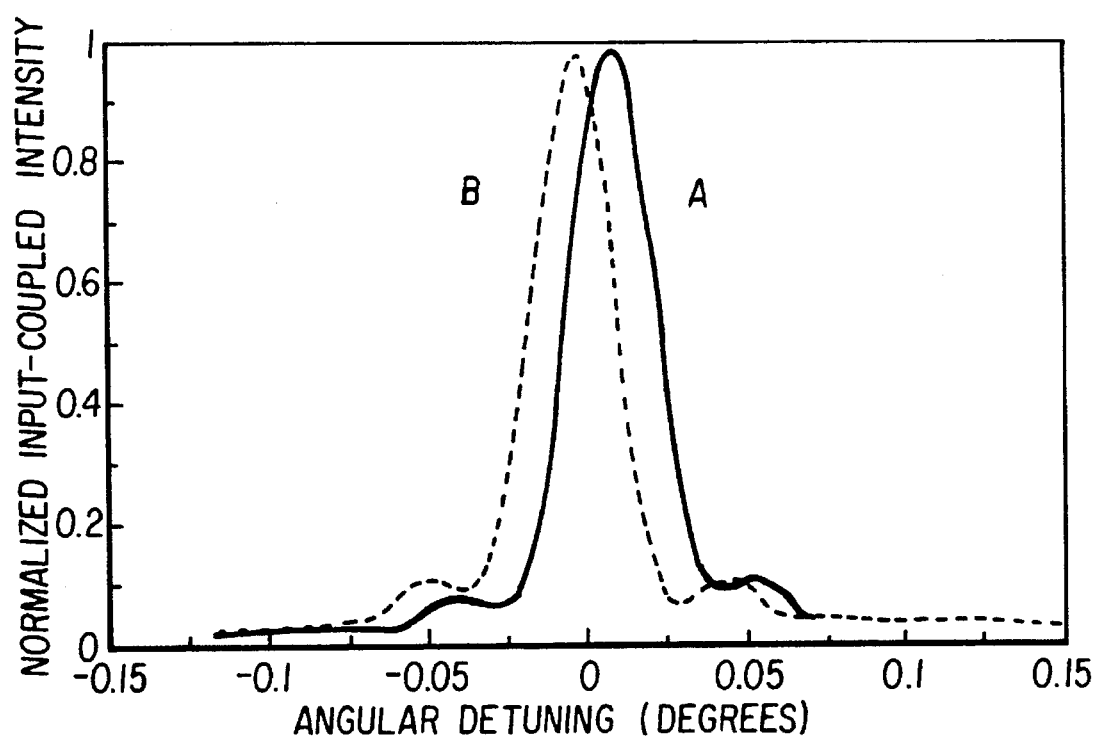
FIG. 6 is a graph showing experimental results for the segmented grating of FIG. 5 when the grating is rotated relative to the incident light beam.
Figure 7:
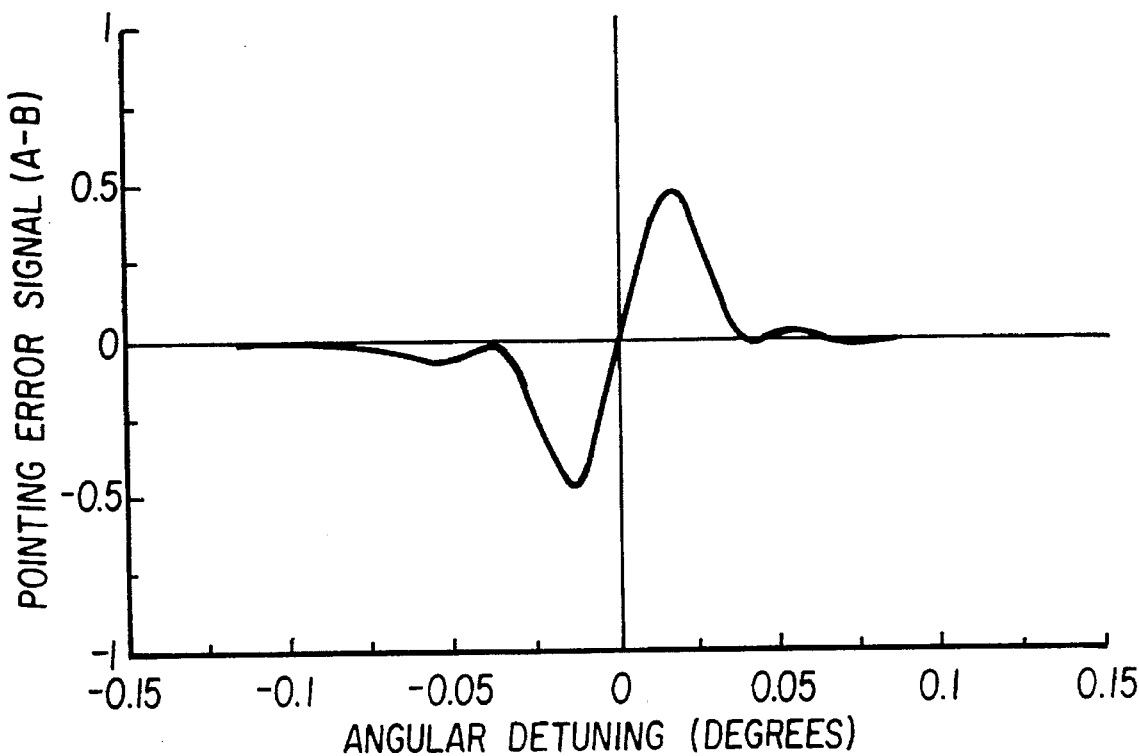
FIG. 7 is a graph showing the difference of the signals for the segments in FIG. 5, a pointing error signal.

FIG. 6 shows experimental results for the individual segments where the signals have been normalized. FIG. 7 illustrates the difference of the signals A and B, the pointing error signal, with the intersection of the grating responses used as a reference angle (zero).

The PES could be used as a simple monitor of incident angle during alignment or for real-time correction in a dynamically operated system. The features of the signal include a bipolar output providing information about the direction of the error, a zero crossing which can be used for indication of no error, and a linear working region where the error is proportional to the magnitude of the signal. The working range is determined by the peak-to-peak separation of the grating responses and can be extended with the broadening of the angular widths of each grating response and separation of the input coupling angle for the peak intensities. Ideally, the grating responses should overlap through their most linear section to provide a linear relation between the error signal and the change of incident angle.

This example demonstrates a simple method for modifying a grating to produce desirable characteristics with a single fabrication step and avoiding the alignment difficulties of alternatively modifying the grating pitch. The waveguide and thickness step were fabricated during the same coating process using an externally controlled translation stage to position a mask and cover a portion of the grating.

EXAMPLE 2

Demonstration of Coarse and Fine Pointing Error Signal Generation

As stated, PES could be used as a monitor of pointing during alignment or for real-time correction in a dynamically operated system. In this example, the methods previously discussed for generating a PES are used in a device to produce "coarse" and "fine" adjustment signals used for signal capture and minimizing the error signal, respectively. A working system can be designed to have a very high resolving power for the PES, however, this would produce a small range of operation. When a rapid scan of the incident angle is performed, the signal might not be observed and thus pointing could not be optimized.

The coarse signal or capture signal is designed to have a working range considerably greater than the fine signal and is used to give an indication of being near the optimum pointing angle. The fine adjustment signal is used for minimizing the error signal and provides a high resolution of adjustment for the incident angle. These signals are realized using two different grating lengths. A coarse signal provided by segmented gratings having a shorter grating length provides input coupling over a greater range of incident angles. The fine signal provides a higher level of resolution for angular adjustment by having a much steeper slope of the signal at the angle of zero pointing error. The range of operation is determined by the FWHM of the coupling efficiency for a scan of the incident beam angle and the working range is determined by the angular separation of the peak efficiencies for the segments and is limited to about twice the FWHM of the signals (i.e., the signals of the individual segments must have some overlap). The different ranges of operation covered by the coarse and fine signals is limited only by the size and power of the incident beam. For this example, the peak separations used were the FWHM value of an individual segment for the particular grating pair.

Figure 8:
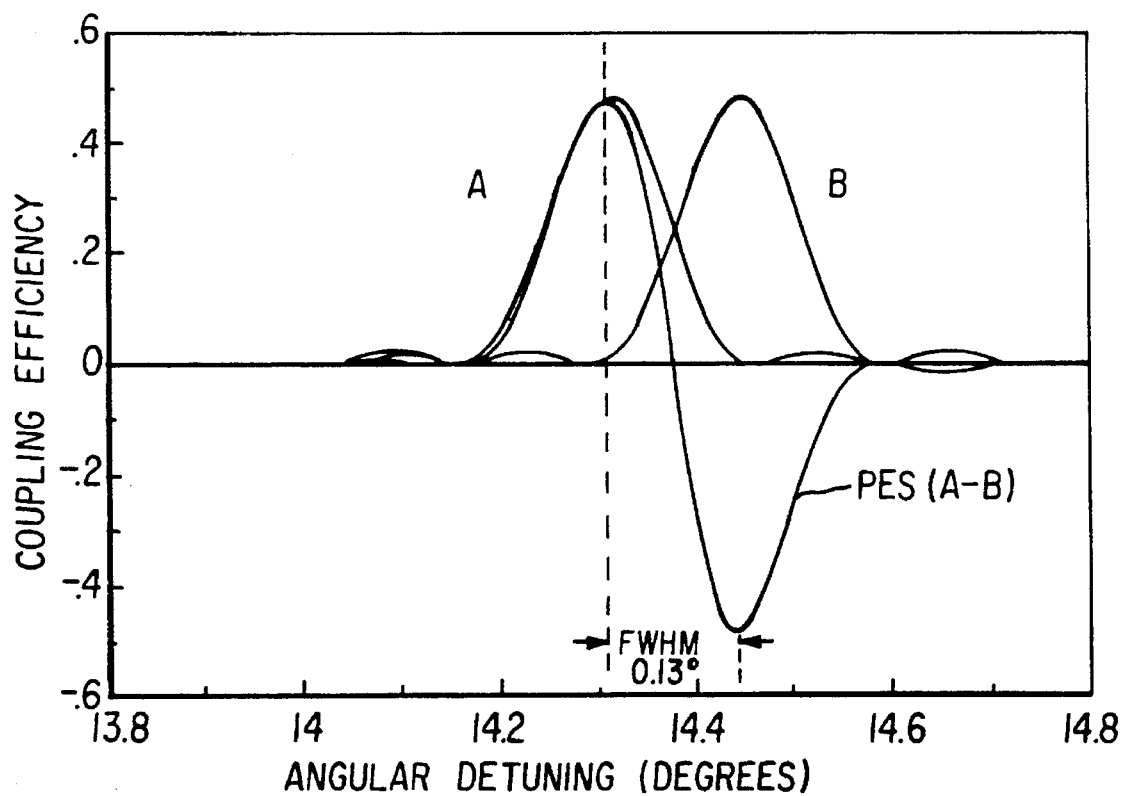
FIG. 8 is a graph illustrating coupling efficiencies for two segments which have their peak efficiencies separated by the FWHM for a 0.5 mm grating length.
Figure 9:
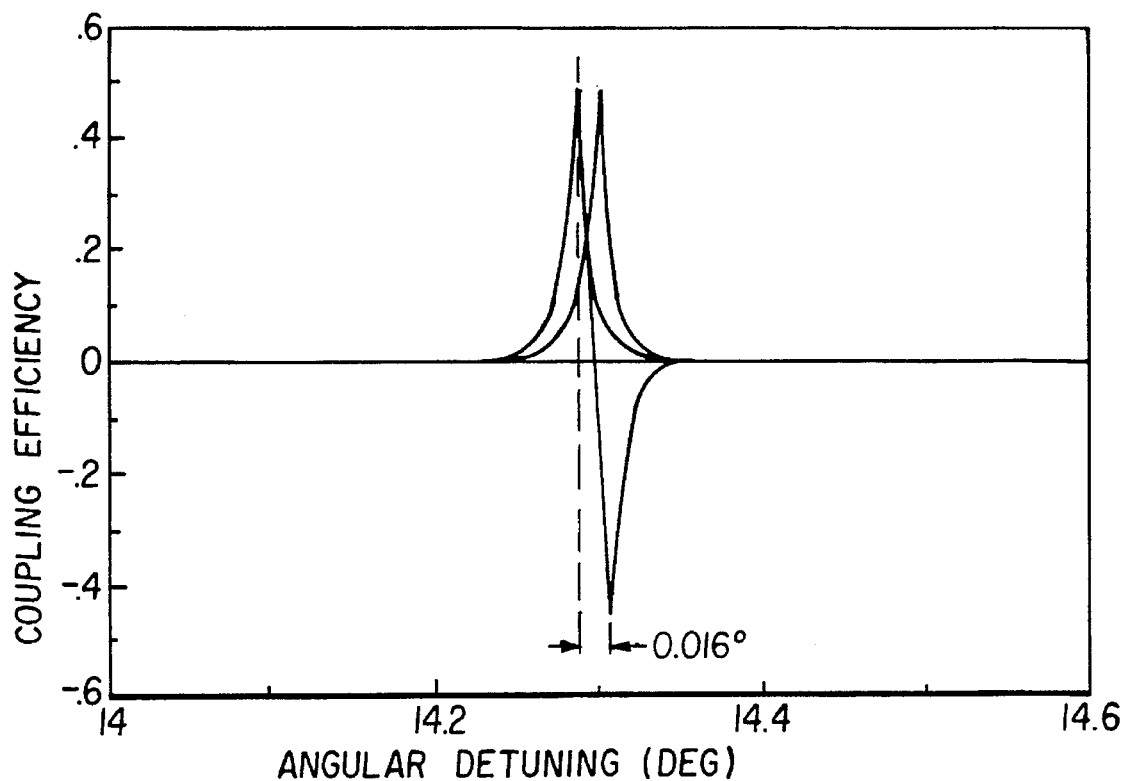
FIG. 9 is a graph similar to FIG. 8 but for grating lengths of 2 mm.
Figure 10:
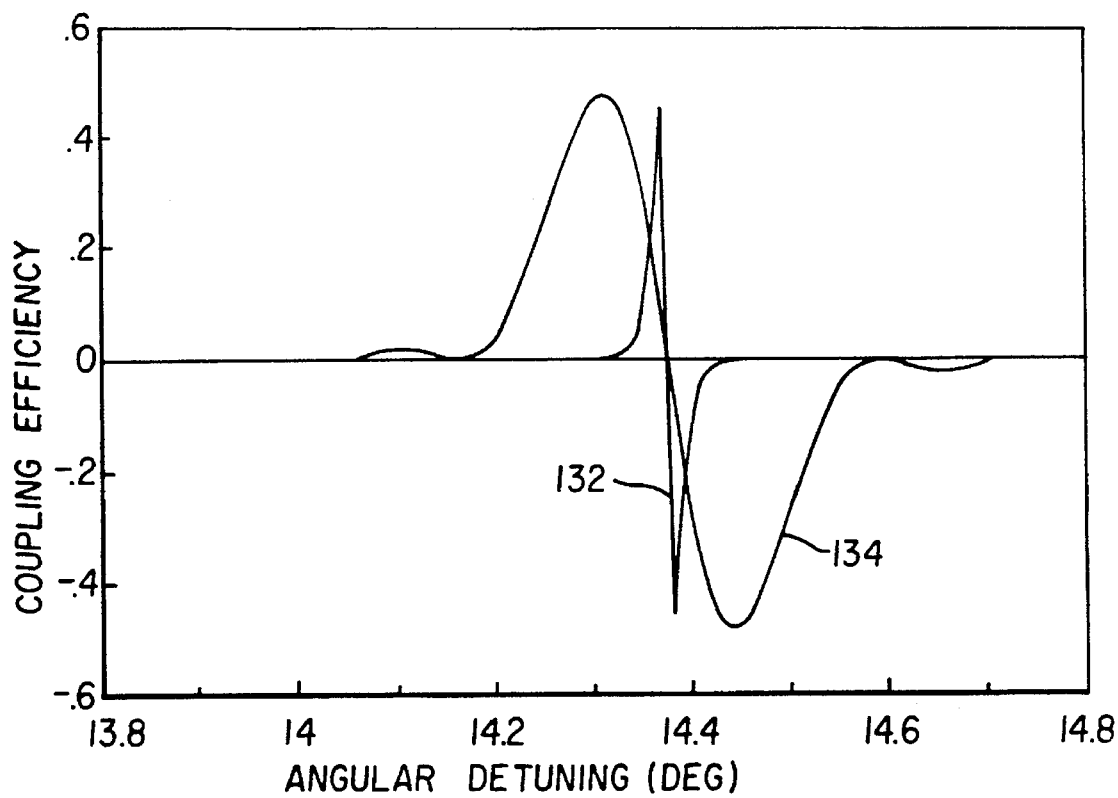
FIG. 10 illustrates overlap of fine and coarse PESs.

In FIG. 8, the coupling efficiencies for two segments (A and B) which have their peak efficiencies separated by the FWHM is shown for gratings having a 0.25 mm length. The FWHM was derived from the results of FIG. 3 and is about 0.13 degrees. The difference of the signals A and B, PES, is also shown and illustrates the range of incident angles over which signal is present (capture range of about 0.4 degrees). FIG. 9 shows the results for grating lengths of 2 mm which are more appropriate for use as fine signals for two reasons. First, the linear working range occurs for a much smaller range of angles. Second, the grating length is greater so the power captured for electronic signal generation will be greater and there will be a decrease in the signal-to-noise level. The FWHM of an individual segment is about 0.016 degrees so that the linear working range for the fine signal is about 0.016 degrees. FIG. 10 shows the overlap of the fine 132 and coarse 134 PESs over a one degree range of scan for the incident angle.

Figure 11:
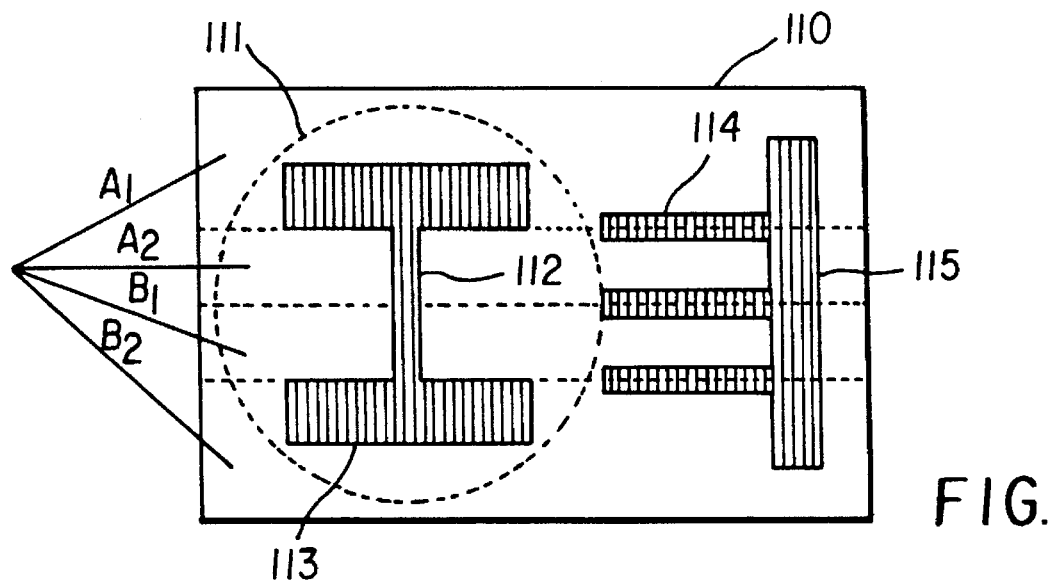
FIG. 11 is a plan view of a grating plate.
Figure 12:
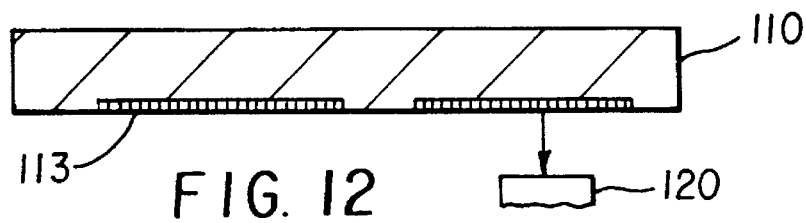
FIG. 12 is an edge view of the grating plate of FIG. 11.

FIGS. 11 and 12 are drawings of an embodiment of a grating plate 110 which uses these principles. The area of illumination 111 from the incident beam contains two grating pairs of signal processing gratings, a coarse signal pair 112 and a fine signal pair 113. The symmetry of the grating pattern and location within the illuminated area is beneficial for balancing the signal for the PES. The segments of the pairs can be differentiated by the grating pitch, waveguide thickness, waveguide refractive index, and cladding overlay parameters. The change in these parameters serve to modify either the diffraction by the grating or the effective refractive index of the waveguide system. Also shown are additional gratings 114 and 115 that are used for isolation and output coupling to detectors 120.

Figure 13:
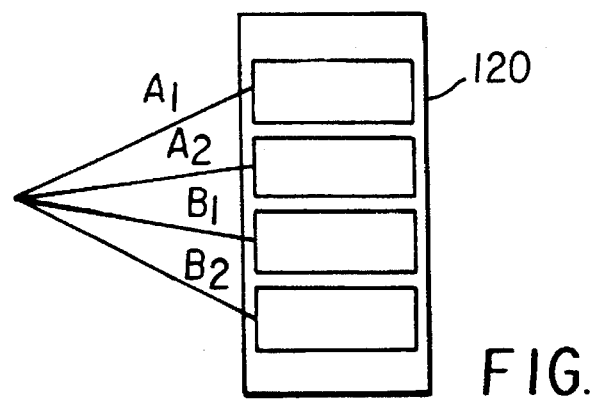
FIG. 13 is a plan view of a photodetector chip used in with the grating plate of FIG. 12.
Figure 14:
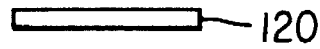
FIG. 14 is an edge view of the photodetector chip of FIG. 13.

In FIGS. 13 and 14, the photodiode detector chip 120 used in conjunction with the grating plate 110 is illustrated. The detectors are not required to be on a single chip but provide a more convenient format of the element. The only requirement is good signal isolation between each segment of the signal processing gratings 112, 113.

Figure 15:
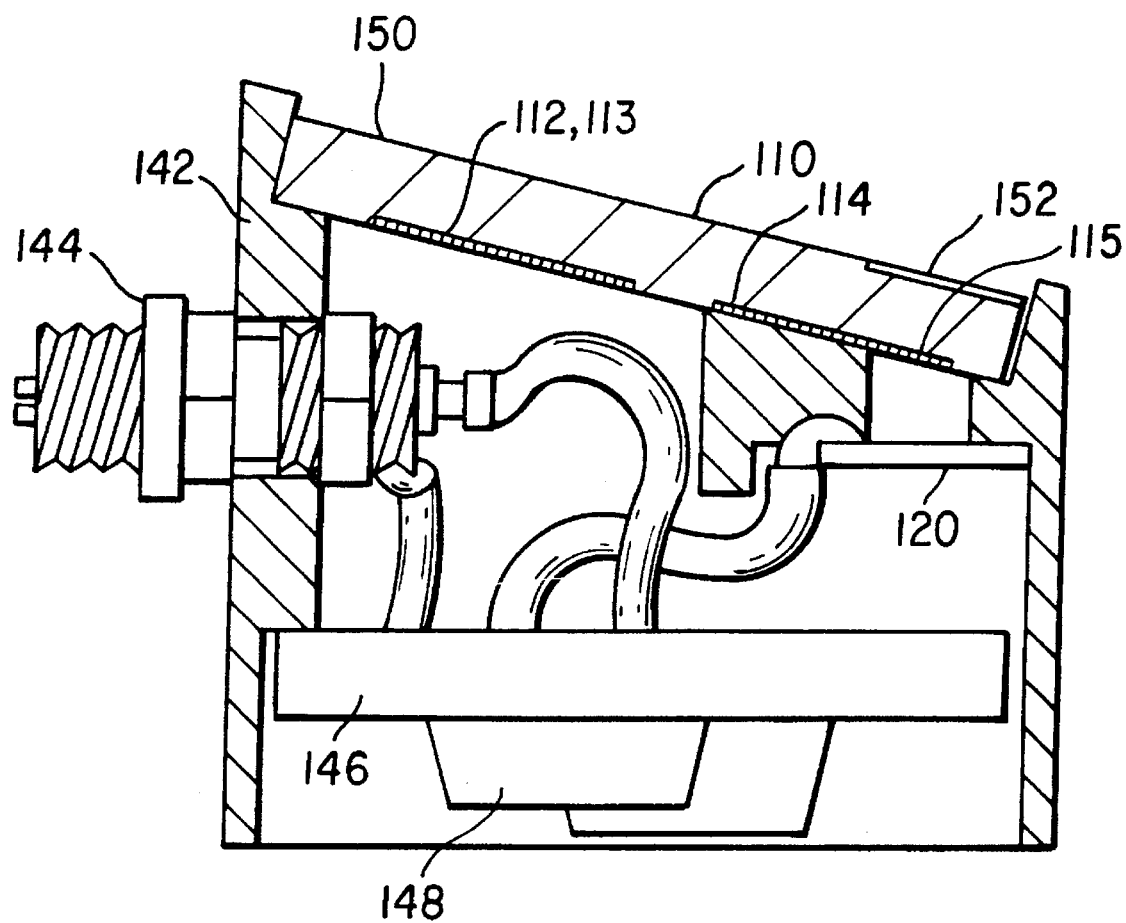
FIG. 15 illustrates a mount for grating chip and photodetector chip of FIGS. 11–14.

FIG. 15 illustrates the mounting of the grating chip 110 into an operational system where the components are combined using a molded or machined mount 142. In addition to holding the grating plate 110, the mount 142 establishes the position of the detector chip 120, and a coaxial connector 144 to a circuit board 146 holding the preamplifiers and processing electronics 148 (power connections not shown). Also, the grating plate 110 can be made most efficient in its signal generation and processing by the addition of an antireflection layer assembly 150 in the area of illumination 111 and a reflecting layer assembly 152 in the area of the decoupling grating 115.

EXAMPLE 3

Demonstration of Generation of Pointing and Displacement Error Signals

In example 2, only the PES was observed. A method for detecting the displacement error signal (DES) along the axes perpendicular to the axis of light propagation was devised. Also, the element was designed to minimize crosstalk between the different signals.

A standard method for measuring displacement is observing the movement of the beam relative to a circular detector divided into quadrants. By appropriate summing and differencing of the detector output, the movement along the two orthogonal axes can be observed. The alternative of using a quad-segmented waveguide grating is presented in this example. The use of a waveguide-grating element to detect multiple signals can be an advantage for rendering the number of incident probe beams, total amount of detectors and electronics required and minimizing the surface of a component being characterized.

Figure 16:
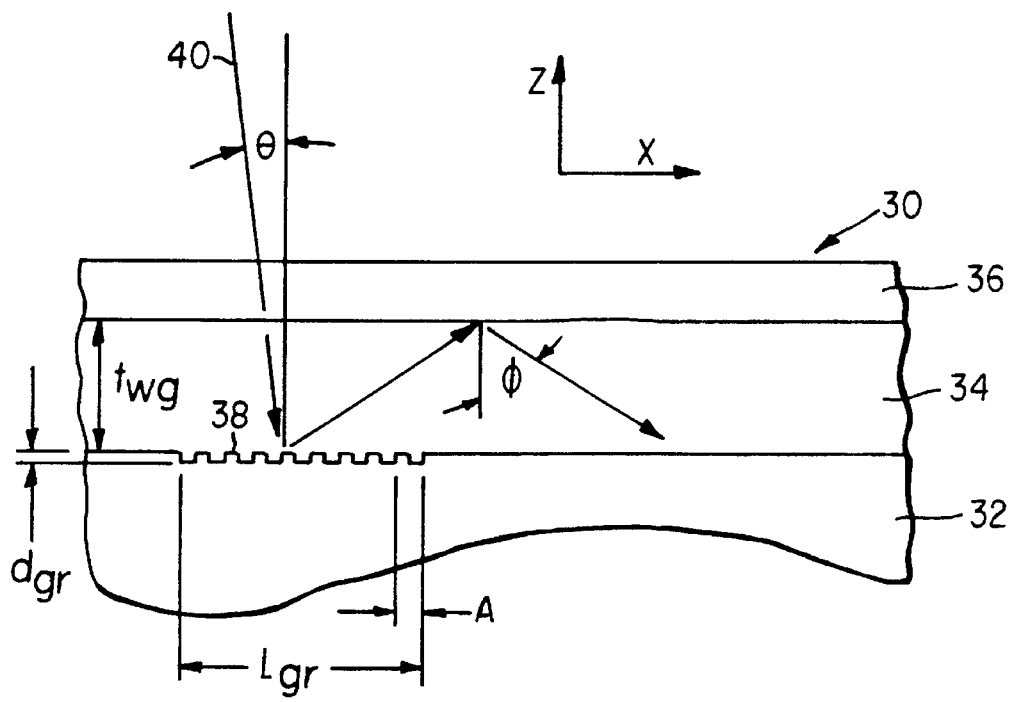
FIG. 16 is a longitudinal sectional view of a waveguide grating system with a ray trace demonstrating the principle of input coupling.
Figure 17:
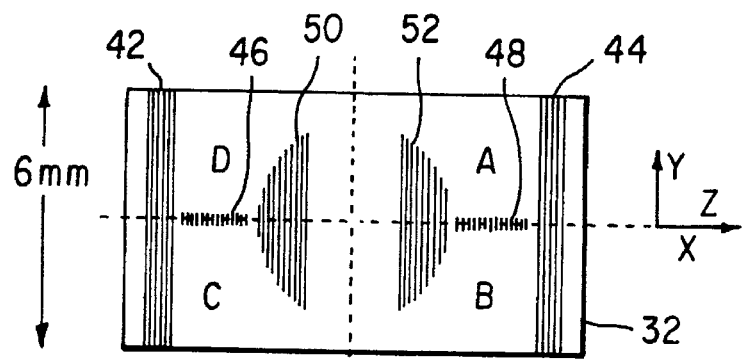
FIG. 17 is a top view of the waveguide grating of FIG. 16 showing a pattern used for simultaneous detection of focus and tracking error signals showing the shape and location of the grating segments.
Figure 18:
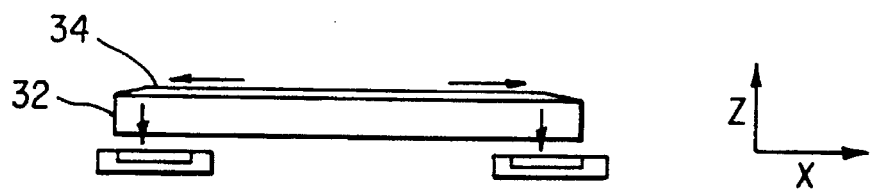
FIG. 18 is a side view of the waveguide structure of FIGS. 16–17 showing the location of the incident beam and photodiode detectors.

The details of this grating system are presented in FIGS. 16–18. The waveguide device 30 has a substrate 32 with refractive index $n_s$, a waveguide layer 34 with refractive index $n_{wg}$ overlaying the substrate 32, and a cladding layer 36 with refractive index $n_c$ overlaying the waveguide layer 34. The cladding may be a cladding material or may be air depending on the characteristics desired. The waveguide layer 34 has a thickness $t_{wg}$. A grating 38 is formed in the substrate 32 and has a grating length $Lg_r$, grating pitch, and grating depth $dg_r$. An incident light beam 40 at an angle θ is diffracted by the grating 38 at an angle φ. The diffracted beam is guided by the waveguide 34. The waveguide layer 34 has four regions, A, B, C and D.

The grating pattern used to sample the optical beam should be altered to optimize the signals detected. Also shown are additional grating areas which perform other functions for directing the light to detectors but are not important for the signal processing. These added gratings are included to demonstrate a concept for a working device. Their fabrication is carried out in parallel with the processing grating and can have the same grating pitch. The needed functions are isolation of the light coupled into adjacent regions A–B and C–D and coupling of the light from the waveguide into detectors 39 mounted below or above the substrate. There will be optimum designs for their area and shape, groove depth, and blaze. The grating pattern 38 includes interchip gratings 42, 44, isolation gratings 46, 48, and processing gratings 50, 52.

The configuration of the processing grating segments 50, 52 requires the light coupled into the waveguide 34 to be directed away from the processing grating. Directing the beam can be accomplished by three methods. The first method is using a waveguide of uniform thickness and controlling the grating pitch of each half (50 vs 52). The second method is using a waveguide of uniform thickness and grating of uniform pitch, and selecting the blaze angle of the grating halves (normal incidence input coupling). The third method is using a grating with uniform pitch in all regions and adjusting the effective index of each region (e.g., adjusting the waveguide thickness of each region by addition or removal of material). The third method was used in this example. Control of the nominal coupling angle for adjacent gratings can be accomplished by fabricating gratings having different pitches or by adjusting the effective index as stated above. Again, the latter method was used in this example.

Figure 19:
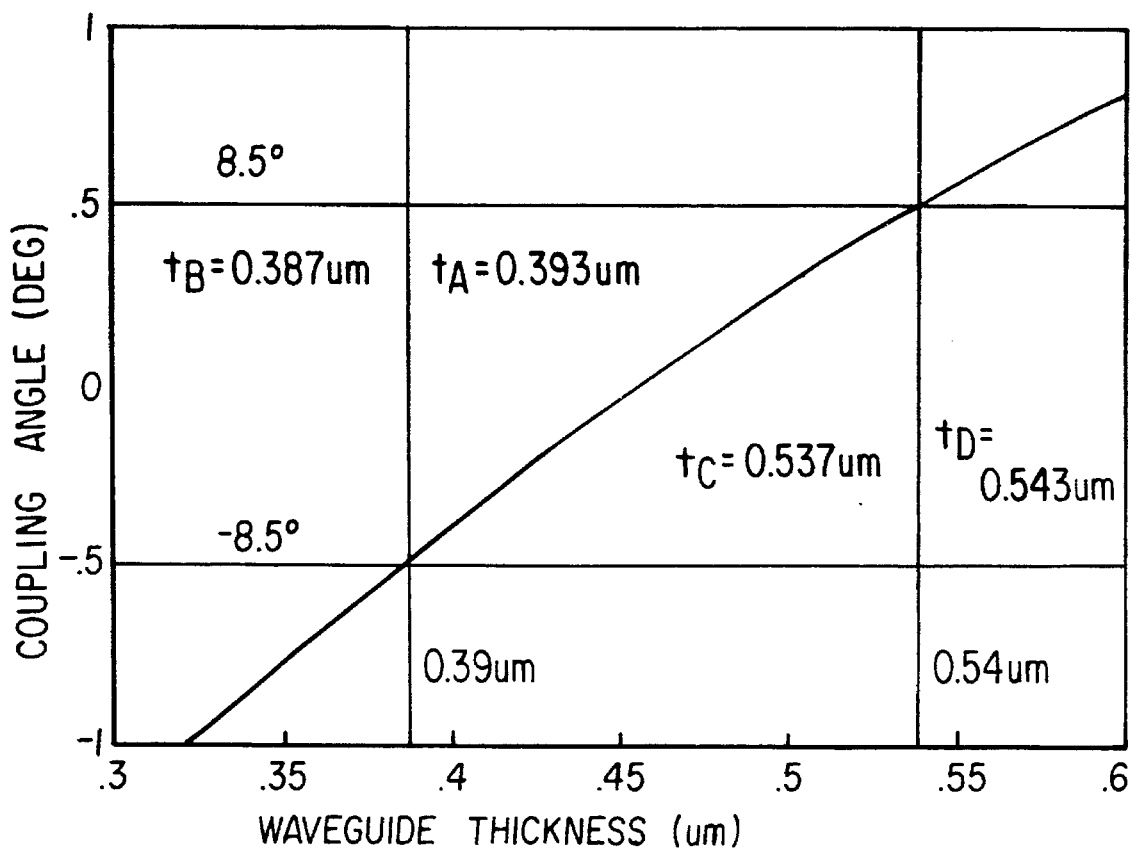
FIG. 19 is a graph showing the dependence of coupling angle on waveguide thickness for the grating system of FIGS. 16–18.
Figure 20:
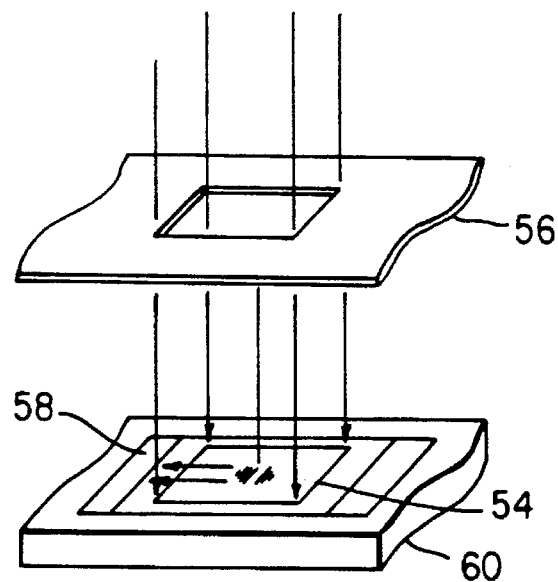
FIGS. 20–22 illustrate the deposition steps for fabrication of a quad-segmented grating showing the deposition mask opening for each deposition step.
Figure 21:
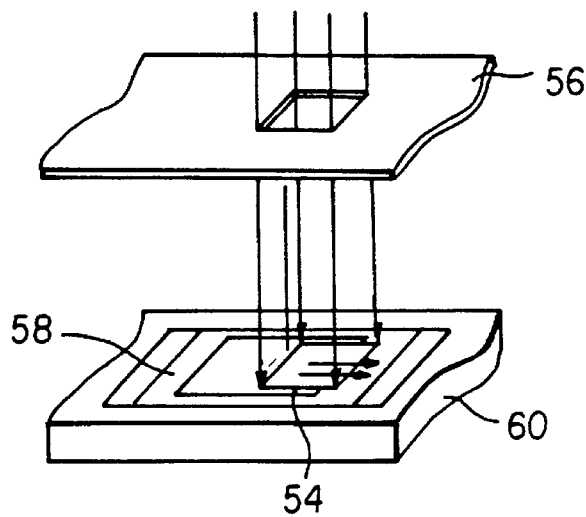
Figure 22:
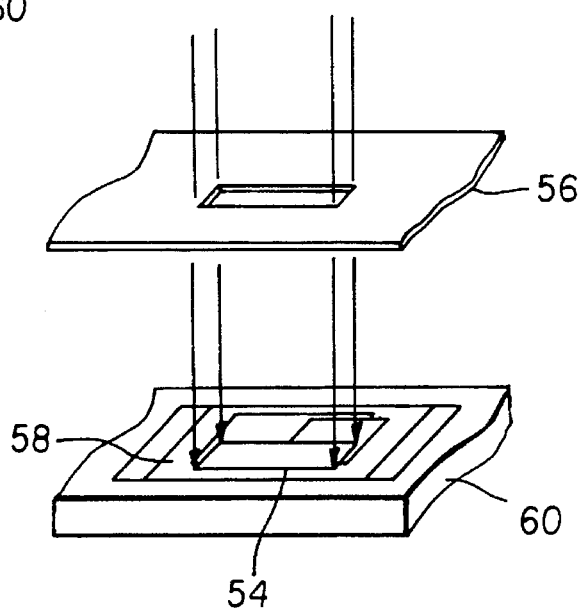

Using standard grating theory and the waveguide system shown in FIGS. 16–18, a grating pitch was selected to properly direct the beam, (i.e., to form halves for the grating with equivalent input coupling angle magnitude but opposite sign). The sign difference results from the difference in the thickness of the waveguide in the regions. The relation between coupling angle and waveguide thickness is shown in FIG. 19. The optimum thicknesses from the model are also indicated for a substrate tilt of 0.5 degrees and the desired thickness for each grating segment $t_A$, $t_B$, $t_C$, and $t_D$.

The steps of the element fabrication are shown in FIGS. 20–23. As in the previous examples, the regions of the grating 54 were created on the substrate 60 with a single deposition process. An externally controlled translation stage was used to position a deposition mask 56 linked to a monitoring system of the thickness of the waveguide 58. In each step a different opening or position of the deposition mask 56 was used to generate different thicknesses in each region. The final thickness for each step was monitored by conventional insitu techniques and monitoring the input coupling characteristics of each region. Other patterns of the deposited thicknesses may be desirable to improve the alignment of the fabricated grating element.

Figure 23:
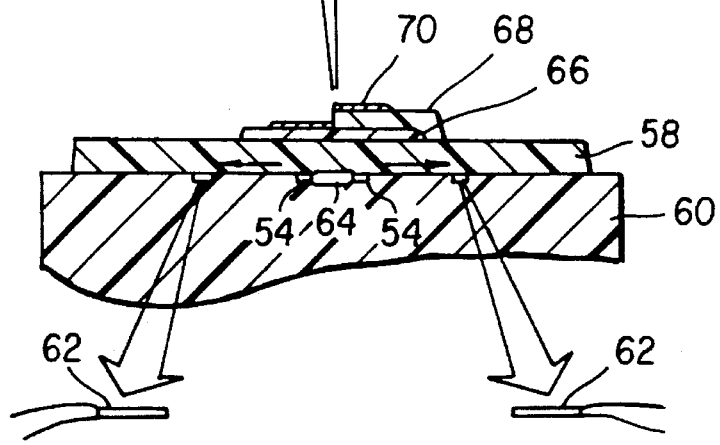
FIG. 23 is a sectional view of the device formed by the deposition steps of FIGS. 20–22.

Referring to FIG. 23, the completed device is illustrated with detectors 62 shown below the substrate 60 with electrical leads. The signal processing gratings (input coupling gratings) 54 are formed in the substrate 60 with an inactive region 64 between the gratings 54. The existing waveguide 58 is shown along with the first, second, and third material additions 66, 68 and 70. In this example, the incident beam 72 is tilted to an angle of 0.5 degrees.

The processing grating was positioned in the path of the laser beam so that the angle of incidence selected provided nearly equivalent intensities of input coupled light for each segment. To observe pointing error signals, the waveguide-grating element was rotated about the y-axis. The error signals for displacement (DES) were the result of movement along the x or y axes to produce $DES_x$ and $DES_y$, respectively.

The operation of the device was tested by placing it in the return beam path of an incident laser beam having a beam waist about the same dimension as the diameter of the processing grating. Using the labels for the regions of FIGS. 16–18 to represent the detector output of each region, the following equations represent the error signals

| | |
|---|---|
| $PES_y = (A+D) - (B+C)$ | Pointing Error Signal with rotation about the y-axis |
| $DES_x = (A+B) - (C+D)$ | Displacement Error Signal along the x-axis |
| $DES_y = (A+C) - (B+D)$ | Displacement Error Signal along the y-axis |

Figure 24:
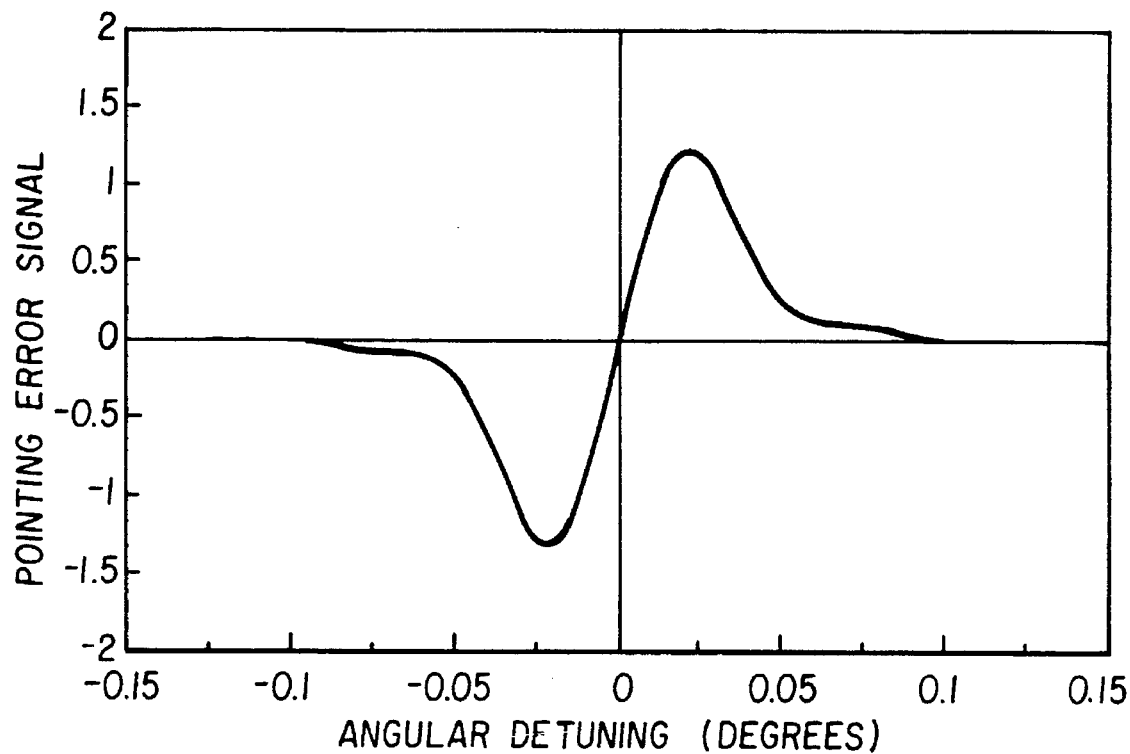
FIGS. 24–26 are graphs showing the results for detection of $PES_y$, $DES_x$ and $DES_y$ which are pointing error signal along the y-axis, displacement error signal along the x-axis, and displacement error signal along the y-axis, respectively.
Figure 25:
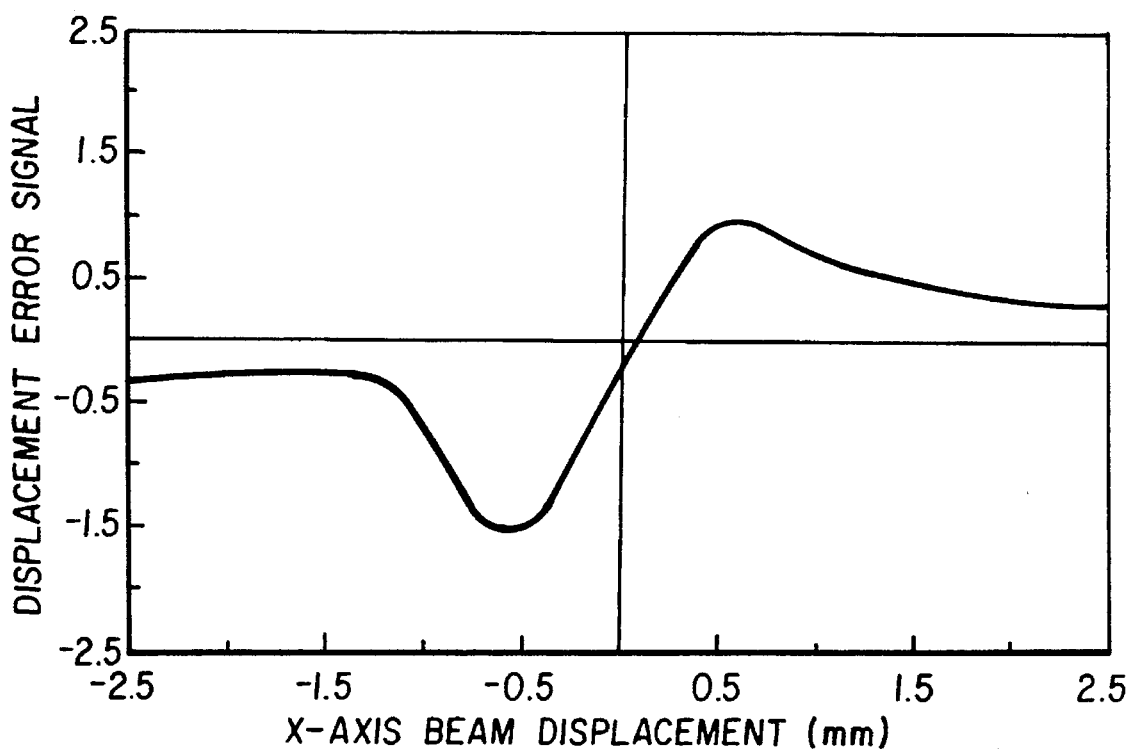
Figure 26:
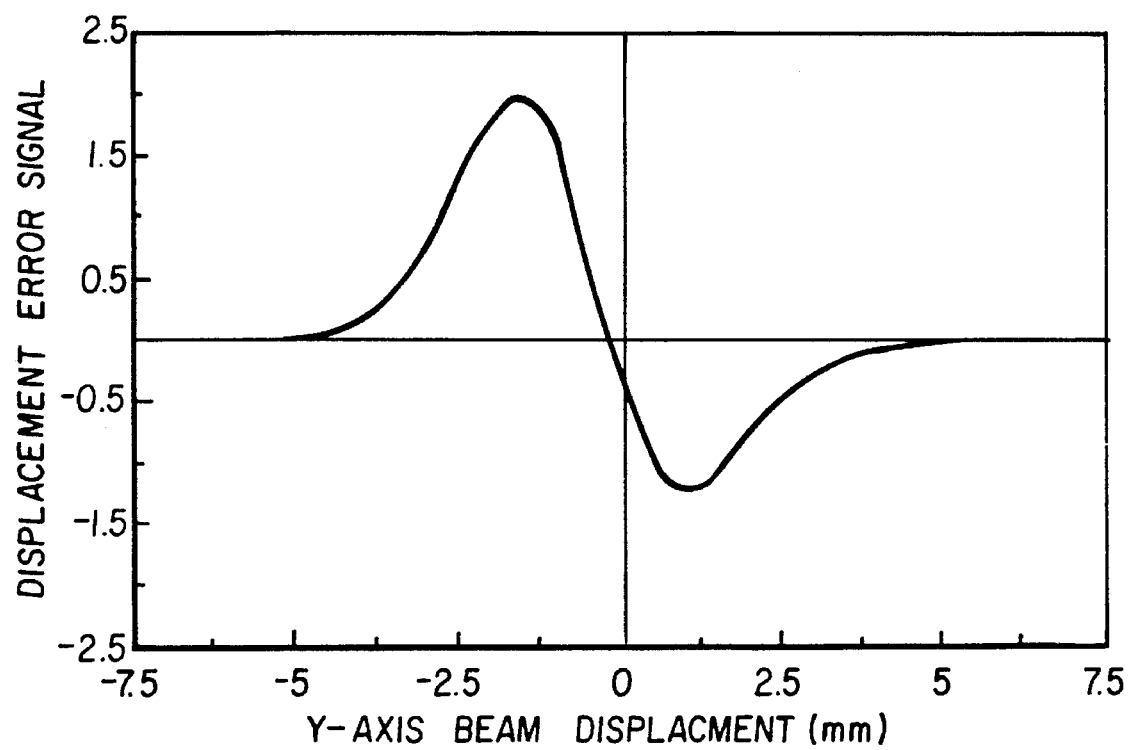

Results for $PES_y$, $DES_x$ and $DES_y$ are shown in FIGS. 24–26.

The PES was only generated by rotation of the element about the y-axis with the grooves of the grating parallel to this axis. By rotation of the element, to align the grooves of the grating differently, a primary sensitivity to a new axis could result. This could also be accomplished by fabricating a segmented-grating having groove directions which are not parallel.

It can now be appreciated that there has been presented a method for sensing pointing and displacement of an optical beam using waveguide gratings. The method can be applied to optical element alignment to monitor tilt and displacement errors and to facilitate alignment of the device. To create these signals, a segmented grating samples the incident beam. Each segment differs in its optimal input coupling angle to provide information about changes in the angle of incidence and the segments are positioned to analyze the symmetry of the incident beam intensity. The grating is patterned to perform multiple functions on the light coupled into the waveguide, including signal processing, isolation of signal channels, and inter-chip communication.

It can now be appreciated that an apparatus for monitoring pointing and displacement of a beam in an optical system has been presented, and a method for monitoring tilt and displacement of a component in an optical system. The method comprises the steps of forming an input coupling grating for receiving an incident beam, forming a first region on said grating for input coupling said incident beam at a first input coupling angle for deriving a first peak of input coupled light efficiency, and forming a second region on said grating for input coupling said incident beam at a second input coupling angle for deriving a second peak of input coupled light efficiency and separating said first input coupling angle from said second input coupling angle by about the full-width-half-maximum of coupling efficiency so that a change in the angle of incidence will produce an increase in the input coupled light of one region and there will be a decrease in light of the other region.

To simultaneously detect the tilt and displacement of an optical component, third and fourth grating regions are formed within the cross-sectional area of the beam and are placed opposite the first and second region pair within the area. The third area is designed to match the input-coupling characteristics of the first region, and the fourth region is designed to match the input-coupling characteristics of the second region. For incident beams having nonuniform but symmetric intensity profiles, the movement of the area of illumination along the axes defining the placement of the gratings will produce an increase in the light input coupled for one grating pair and there will be a decrease in the light input coupled for the other grating.

It can also be appreciated that there has been presented a method for forming an optical device wherein an incident beam of light undergoes changes in pointing or the area of illumination on the sensing element changes in response to changes in tilt or displacement of a component in an optical system. The method comprises the steps of forming a substrate, forming a waveguide layer on a surface of a substrate, forming a cladding and positioning the waveguide layer between the cladding and the substrate, forming waveguide regions having different waveguide thicknesses and adjusting an effective refractive index of each region, and input coupling the return beam via a linear input coupling grating.

The method and apparatus described use integrated optical components which have the advantage of being planar. With integrated optical components, alignment is part of the fabrication process and optical components with detectors and preamplifiers can be easily integrated when using silicon based substrates. The integrated optical elements provide new methods of detecting error signals not available by conventional optical components.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A method of detecting a change in the angle of incidence of an incident beam, comprising the steps of:

providing an input coupling grating for receiving said incident beam at the angle of incidence;

forming a first region on said grating for input coupling said incident beam at a first input coupling angle, said step of forming said first region including defining in said first region a first peak input coupling angle at which input coupled light intensity of the incident beam into said first region is at a first peak of input light efficiency;

forming a second region on said grating for input coupling said incident beam at a second input coupling angle, said step of forming said second region including defining in said second region a second peak input coupling angle at which input coupled light intensity of the incident beam into said second region is at a second peak of input light efficiency;

defining said first peak input coupling angle to be separate from said second peak input coupling angle;

determining the angle of incidence of said incident beam based on the input coupled light intensity in each of the first and second regions relative to said first and second peak input coupling angles; and detecting a change in the angle of incidence of said incident beam based on an increase in input coupled light intensity in one of the first and second regions and a corresponding decrease in input coupled light intensity in the other of the first and second regions relative to said first and second peak input coupling angles.

2. A method, as set forth in claim 1, including the steps of:

adjusting pointing of said incident beam to an angle corresponding to an intersection angle at an intersection of responses of said first and second grating regions and developing first and second differential signals, said first differential signal representing a difference between said intersection angle and said first input coupling angle at peak efficiency, said second differential signal being a signal representing a difference between said intersection angle and said second input coupling angle at peak efficiency; and relating an increase or decrease of said first and second differential signals to direction and magnitude of a change in pointing.

3. A method, as set forth in claim 1, including the step of providing a bipolar output signal providing information about direction of a pointing error.

4. A method, as set forth in claim 1, including the step of providing a zero crossing indicating no pointing error.

5. A method, as set forth in claim 1, including the step of providing a linear signal wherein magnitude of a pointing error is proportional to magnitude of the signal.

6. A method, as set forth in claim 5, wherein the linear signal is determined by peak-to-peak separation of grating responses and is extendible with broadening of angular width of each grating response and separation of input coupling angle for peak intensity.

7. A method, as set forth in claim 6, including the step of overlapping grating responses to provide a linear relation between error signal and change of incident angle.

8. A method, as set forth in claim 1, wherein input-coupling efficiency of the grating depends on the angle of incidence of said incident beam.

9. A method, as set forth in claim 1, including the step of directing the beam using a grating with uniform pitch in all regions and adjusting an effective index of each region.

10. A method, as set forth in claim 1, including the step of adjusting an effective index by adjusting a waveguide thickness of each region by addition or removal of material.

11. A method, as set forth in claim 1, including the step of controlling a nominal coupling angle for adjacent gratings by adjusting an effective index of each of said adjacent gratings.

12. A method, as set forth in claim 1, including the step of adjusting an effective index by adjusting a waveguide thickness of each region by addition or removal or material.

13. A method, as set forth in claim 1, including the step of separating said first input coupling angle from said second input coupling angle by about full-width-half-maximum of coupling efficiency so that a pointing error does not produce either an increase or decrease of input coupled light.

14. An apparatus for monitoring tilt of a reference beam in an optical device, comprising:

a first input coupling grating for receiving said reference beam at an angle of incidence, said first input coupling grating having a first grating length, and first and second regions for input coupling said reference beam over a first range of input coupling angles and producing a first signal; and a second input coupling grating for simultaneously receiving said reference beam at said angle of incidence, said second input coupling grating having a second grating length and third and fourth regions for input coupling said reference beam over a second range of input coupling angles and producing a second signal, said first grating length being greater than said second grating length making said first range of incident angles over which input coupling occurs less than said second range of incident angles, wherein said first input coupling grating has defined therein a first peak input coupling angle at which an intensity of light from said reference beam coupled at said first peak input coupling angle into at least one of said first and second regions is at a first peak of input light intensity, and said second input coupling grating has defined therein a second peak input coupling angle at which an intensity of light from said reference beam coupled at said second peak input coupling angle into at least one of said third and fourth regions is at a second peak of input light intensity, said second peak input coupling angle being defined as separate from said first peak input coupling angle.

15. An apparatus, as set forth in claim 14, wherein tilt of said return beam is indicative of tilt a component of said optical device.

16. A method for monitoring tilt and displacement of a component in an optical system, comprising the steps of:

providing an input coupling grating for receiving an incident beam at an incident angle, said incident angle defining a position of said component;

forming a first region on said grating for input coupling said incident beam at a first input coupling angle, said step of forming said first region including defining in said first region a first peak input coupling angle at which input coupled light intensity of the incident beam into said first region is at a first peak of input light efficiency;

forming a second region on said grating for input coupling said incident beam at a second input coupling angle, said step of forming said second region including defining in said second region a second peak input coupling angle at which input coupled light intensity of the incident beam into said second region is at a second peak of input light efficiency;

defining said first peak input coupling angle to be separate from said second peak input coupling angle;

forming third and fourth grating regions within a cross-sectional area of the beam and defining in each of said third and fourth grating regions third and fourth peak input coupling angles at which the input coupled light of the incident beam into said third and fourth regions are at third and fourth peaks of input light efficiency respectively;

placing said third and fourth grating; regions opposite said first and second regions determining the position of said component based on the angle of incidence of said incident beam, said determining step including detecting the angle of incidence based on the input coupled light intensity in each of the first, second, third and fourth regions relative to said first, second, third and fourth peak input coupling angles; and detecting tilt and displacement of said component based on a chance in the angle of incidence as determined by increased input coupled light intensity in at least one of the first, second, third and fourth regions and correspondingly decreased input coupled light intensity in others of the first, second, third and fourth regions.

17. A method, as set forth in claim 16, including the step of matching input-coupling characteristics of said third region with input-coupling characteristics of said first region.

18. A method, as set forth in claim 16, including the step of matching input-coupling characteristics of said fourth region with input-coupling characteristics of said second region.

19. A method, as set forth in claim 16, wherein said first and third regions form a first grating pair and said second and fourth regions form a second grating pair, and including the step of moving the area of illumination along axes defining placement of the gratings and producing an increase in light input-coupled for one of the first and second grating pairs and decreasing light input-coupled for the other of said first and second grating pairs for incident beams having nonuniform but symmetric intensity profiles.

20. An apparatus for monitoring displacement of a reference beam in an optical device, comprising:
- a first input coupling grating for receiving said reference beam at an angle of incidence, said first input coupling grating having a first grating length for input coupling said reference beam over a first range of input coupling angles and producing a first signal; and
- a second input coupling grating for simultaneously receiving said reference beam at said angle of incidence, said second input coupling grating having a second grating length for input coupling said reference beam over a second range of input coupling angles and producing a second signal, said first grating length being greater than said second grating length making said first range of incident angles over which input coupling occurs less than said second range of incident angles, wherein said first input coupling grating has defined therein a first peak input coupling angle at which an intensity of light from said reference beam coupled at said first peak input coupling angle into said first input coupling grating is at a first peak of input light intensity, and said second input coupling grating has defined therein a second peak input coupling angle at which an intensity of light from said reference beam coupled at said second peak input coupling angle into said second input coupling grating is at a second peak of input light intensity, said second peak input coupling angle being defined as separate from said first peak input coupling angle.

\* \* \* \* \*